Sept. 29, 1931.   C. SKILLMAN   1,825,164
PORTABLE SAW
Filed May 31, 1930   2 Sheets-Sheet 2
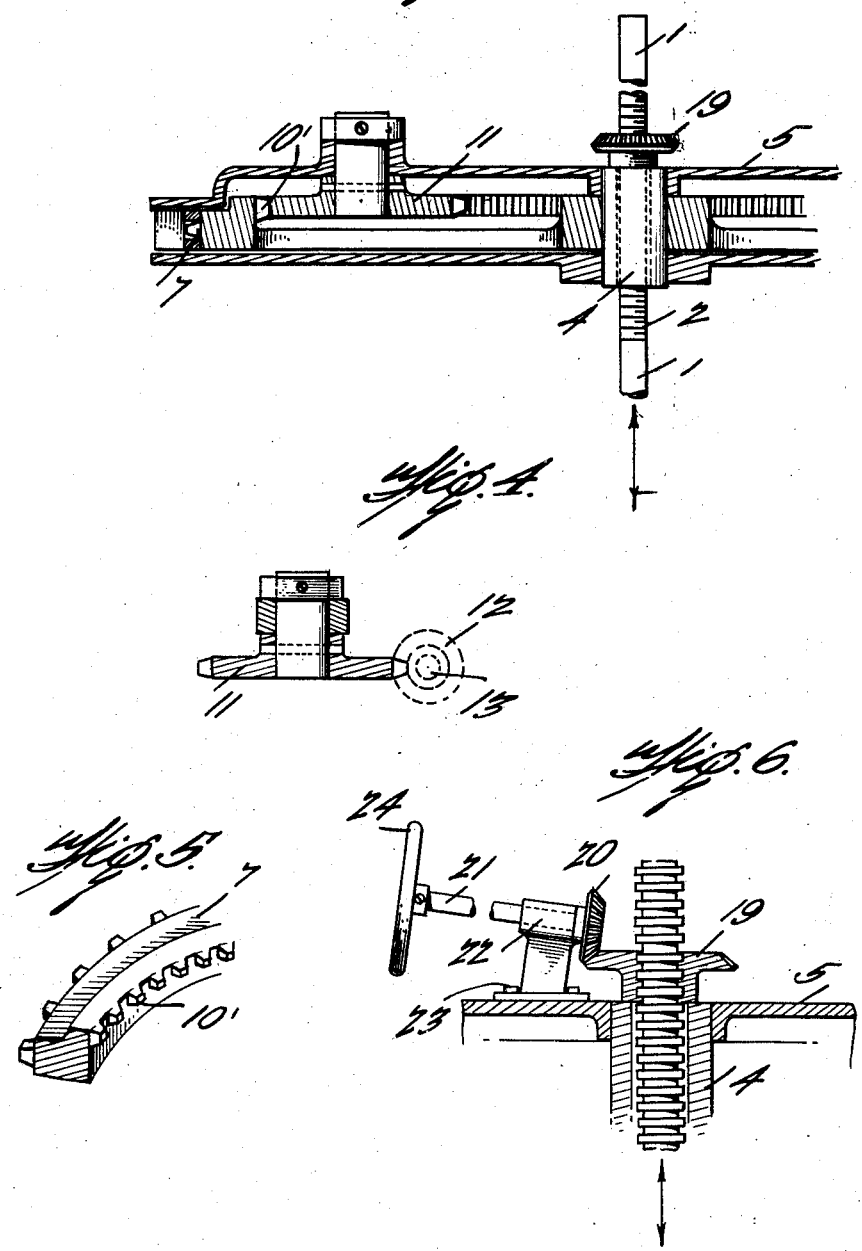
C. SKILLMAN
INVENTOR
BY Victor J. Evans
ATTORNEY Patented Sept. 29, 1931

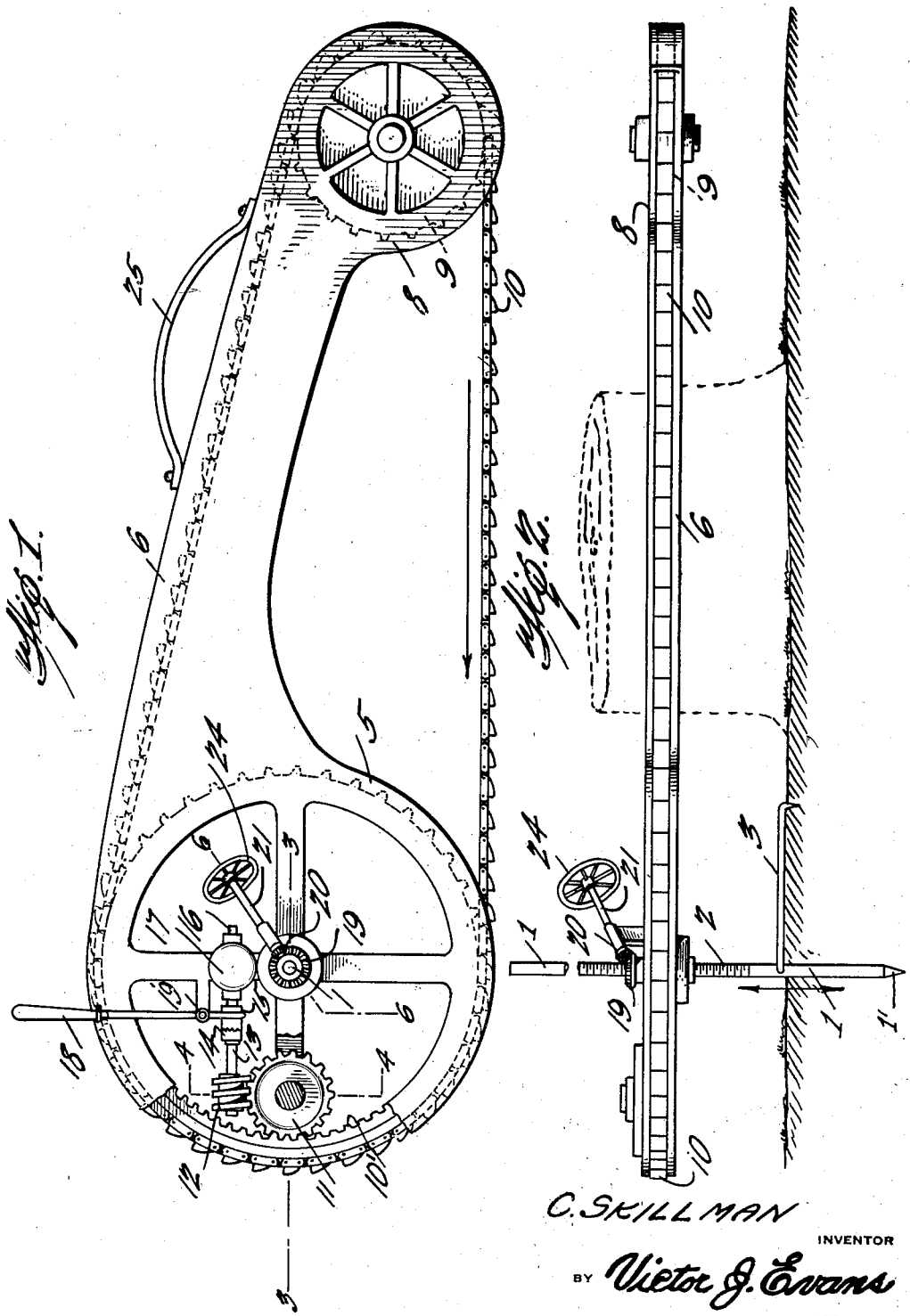

1,825,164

UNITED STATES PATENT OFFICE

CLARENCE SKILLMAN, OF SWINGLEY, MONTANA

PORTABLE SAW

Application filed May 31, 1930. Serial No. 458,170.

My present invention has reference to a portable motor operated hand controlled saw for felling trees, and my object is the provision of a tree felling device which may be moved in close proximity to the tree, adjusted with respect thereto and which will perform the manual labor now incident to the felling of trees with hand saws or with axes.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a plan view of a saw felling machine in accordance with this invention.

Figure 2 is a side elevation thereof.

Figure 3 is a detail sectional view approximately on the line 3—3 of Figure 1.

Figure 4 is a similar sectional view approximately on the line 4—4 of Figure 1.

Figure 5 is a fragmentary perspective view of the chain sprocket provided with the internal gear.

Figure 6 is a sectional view approximately on the line 6—6 of Figure 1.

In carrying out my invention I make use of a support 1 that has a pointed end 1' and which is designed to be driven into the ground in close proximity to the tree to be felled. The support 1 is in the nature of a cross sectionally round rod which is threaded, as at 2, for a determined portion of its length. The numeral 3 designates an arm or plate that has an angle end which is inserted in the ground and its second end slotted to afford a guide for the support 1.

The support 1 is journaled through a tubular bearing 4 in the central portion of one of the rounded ends 5 of the hollow carriage 6 of the improvement. The sleeve 4 also provides a bearing for the saw drive sprocket wheel 7 as well as a spacing element for the sides of the carriage.

The reduced central or body portion of the carriage 6 has both of its ends rounded, one of which being referred to by the character 5 and the other by the numeral 8. The rounded ends project from one side of the body of the carriage and have their outer faces open, and the saw drive sprocket wheel 7 is journaled in the rounded end 5 of the carriage. The second rounded end of the carriage has also journaled therein a sprocket wheel 9 which is smaller than the sprocket wheel 7; and around these sprocket wheels there is trained the chain body of an endless chain saw 10, the teeth of the saw, of course, passing through the open faces of the ends 5 and 8 of the carriage 6.

The sprocket wheel 7 is provided on its inner periphery with internal gear ring 10' which is in mesh with a worm wheel 11, that has its shaft suitably journaled through openings in the rounded end 5 of the carriage. The worm wheel 11 is engaged by a worm 12 on a shaft 13, the said shaft having a clutch surface 14 designed to be engaged by a clutch element 15 which is splined for movement on the shaft 16 of a motor 17 which is supported upon the upper face of the end 5 of the carriage. The movable clutch element 15 is provided with the usual annular groove in which is received the forked end of a lever 18 which is pivotally supported, as at 19', on the end 5 of the carriage. The motor may be of any desired type and as far as the description has progressed it will be apparent that when the clutch element 15 is in clutching engagement with the element 14 the sprocket wheel 7 will be turned to impart a continuous movement to the saw 10.

Screwed on the threaded portion 2 of the support 1 and resting on the top and at the center of the end 5 of the carriage 6 there is a beveled gear 19 which is in mesh with a similar gear 20 on a shaft 21 that is journaled in a suitable bearing 22 fixed, as at 23, on the top of the end 5 of the carriage 6. The shaft 21 has on its outer end a hand wheel 24, and by this arrangement it will be apparent that the carriage may be vertically adjusted on the support 1. Also the support 1 may be driven at an angle into the ground which will support the carriage and saw at a desired angle with respect to the tree to be cut.

The outer end of the carriage is provided with an arched handle 25 to be gripped by the operator and whereby the saw may be moved toward the tree during the sawing or felling operation.

It is believed the foregoing description when read in connection with the accompanying drawings will fully and clearly set forth the construction and advantages of the improvement so that further description will not be required. It is, of course, to be understood that the construction is light so that the same can be conveniently carried by the operator and that only a single hand may be employed in sawing the trees and that the trees can be felled with a minimum amount of physical exertion.

Having described the invention, I claim:

1. A tree felling apparatus including a carriage having enlarged round ends which are partly open and sprocket wheels journaled in each of said ends, one of which provides a drive sprocket, said drive sprocket having on its inner periphery a ring gear, a chain carrying teeth trained around the sprocket wheels and providing an endless saw, a pointed ground entering support having a threaded portion which is received through one of the rounded ends of the carriage and through the center of the drive sprocket, an interiorly threaded beveled gear concentric with the drive sprocket engaging the threaded portion of the support, a gear mounted for turning on the carriage engaging the beveled gear, and a motor driven gear engaging with the ring gear on the drive sprocket.

2. A tree felling apparatus including a carriage comprising a hollow member having enlarged ends which are partly open and sprocket wheels journaled in each of said ends, one of the sprockets providing a drive sprocket, said drive sprocket having an inner peripheral ring gear, a chain carrying teeth trained around the sprocket wheels and providing an endless saw, a bearing sleeve received through the sides of the carriage and through the hub of the drive sprocket, providing a bearing for the drive sprocket and a spacing element for the opposite faces of the carriage, a pointed ground support having a threaded portion which is received through the sleeve, an interiorly threaded beveled gear engaging the threaded portion of the support and resting on the sleeve and arranged concentrically with the drive sprocket, a hand operated gear in mesh with the beveled gear and a motor driven gear engaging with the ring gear on the drive sprocket.

In testimony whereof I affix my signature.

CLARENCE SKILLMAN.